March 13, 1956    S. N. COUZENS ET AL    2,738,434
INDUCTION GENERATORS
Filed Sept. 8, 1953
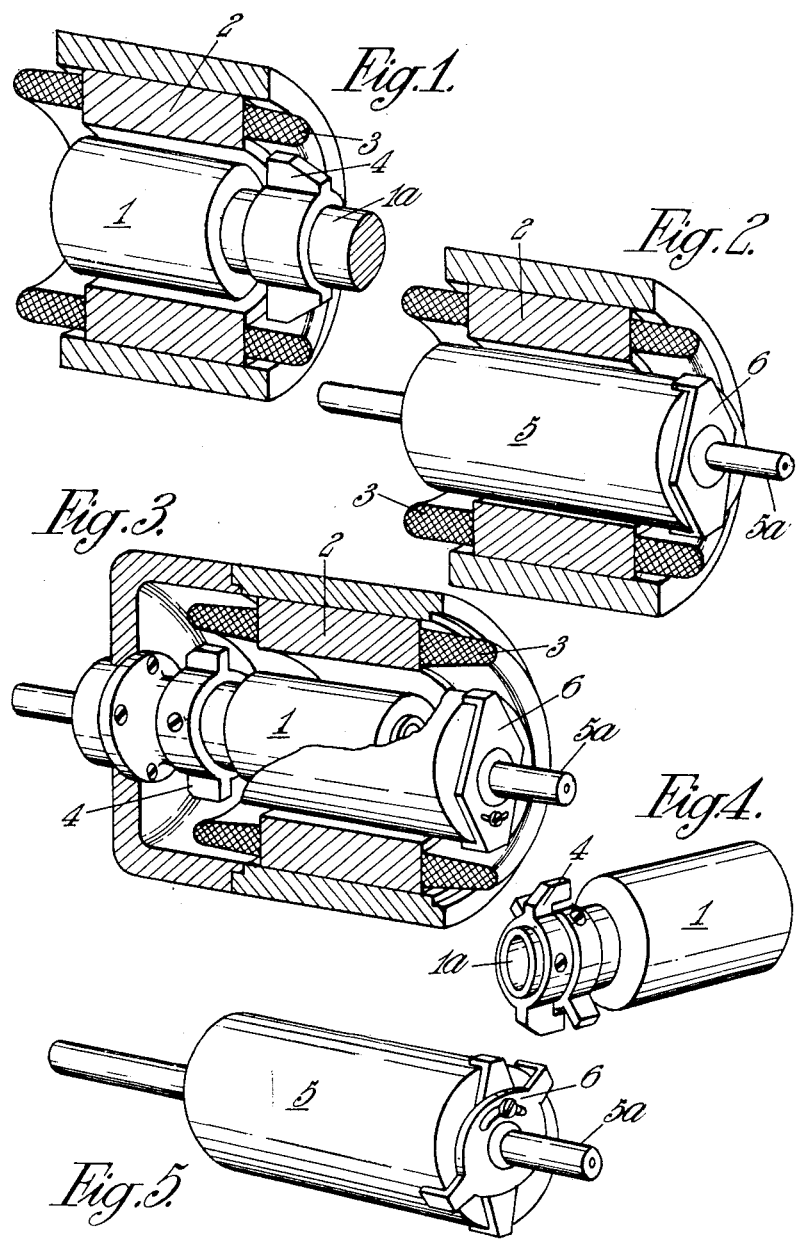
Inventors
S. N. Couzens
A. E. W. Hibbitt
By Glascot Downing Seebold
Attys.

United States Patent Office 2,738,434
Patented Mar. 13, 1956

2,738,434

INDUCTION GENERATORS

Sydney Norman Couzens and Alec Ennever William Hibbitt, Beckenham, England, assignors to Muirhead & Co. Limited, Beckenham, England Application September 8, 1953, Serial No. 378,742

Claims priority, application Great Britain September 10, 1952

4 Claims. (Cl. 310—171)

This invention relates to induction generators (an alternating current electrical machine) used for electrical computing and control purposes and designed to generate an output voltage proportional to the speed at which the rotor is driven; the frequency of the generated voltage being the same as the frequency of the voltage supplied to the machine.

In the present known art the induction generators usually used for such purposes comprise a slotted stator with two windings whose axes are substantially in mutually perpendicular relation, one constitutes the exciting winding and the other the output winding. A sleeve rotor of electrically conductive material, usually copper or aluminium, is mounted concentrically in the stator, and the magnetic circuit is completed by a substantially cylindrical core of magnetic material positioned concentrically in the sleeve rotor but not revolving with it.

Errors exist in known machines of this type which cause (a) a voltage to appear in the output winding of the machine when there is no relative motion between the stator and the rotor, and (b) variations in amplitude and phase of this voltage for different positions of rest of the rotor.

Hitherto (a) has been reduced by using a core having two flats ground on its normally cylindrical surface and positioning these flats relative to the stator to reduce the undesired voltage to a minimum.

The variation in amplitude of the residual voltage referred to in (b) has been reduced by drilling a hole of appropriate size in a chosen position in the sleeve rotor, presumably correcting thereby an asymmetry in its conductivity. No specific compensation has been provided to correct for the variation of phase of the residual voltage.

The means hitherto employed are only partially effective especially at frequencies above 50 C./S. and an object of the invention is to provide improved compensation which remains effective over a wider range of frequencies including 50 C./S.

The invention consists of an induction generator of the kind described having shunts of magnetic material added to the magnetic circuit adjustable rotationally with respect to the rotational axis.

Further according to the invention, the two flats on the core may be dispensed with and a shunt of magnetic material is mounted so that it may be adjusted axially and/or rotationally with respect to the stator and is positioned between the coil ends of the stator windings with the tips of the shunt adjacent to the stator teeth.

The section of the shunt and the length of the projection towards the stator teeth may be separately varied or selected and the angular position of the shunt relative to the axis of the stator windings is adjusted on test to effect the desired compensation.

To provide compensation for variation in phase of the residual voltage, which may already exist or may be caused by drilling holes in the sleeve rotor, according to the invention another shunt of magnetic material may be attached to one end of the rotor across a diameter.

The section of the shunt and the length of its projection towards the stator teeth may be separately varied or selected and the angular position of the shunt with respect to the rotor is adjusted to achieve the desired compensation.

Either of the shunts may be constructed of a plurality of magnetic parts which together serve as an adjustable magnetic shunt.

Embodiments incorporating the features of the invention are shown in the accompanying drawings.

Figure 1 is a cut away perspective view of the embodiment with the sleeve rotor removed;

Figure 2 is a similar view with the sleeve rotor in place;

Figure 3 is an assembly view cut away to show the details;

Figure 4 is a view of part of Figure 1 showing a modified form of stator shunt;

Figure 5 is a view of part of Figure 2 showing a modified form of rotor shunt.

A magnetic core 1 is surrounded by an outer stator 2 with windings 3 thereon.

The core is formed with an extension 1a of lesser diameter than the main core and on this is mounted the shunt 4 for radial and axial adjustment.

Over the core there fits the sleeve rotor 5 rotationally supported by means of a spindle 5a and over one end of the spindle 5a there is mounted the shunt 6 which may be adjusted for angular positions with respect to the sleeve rotor.

Various modifications may be made within the scope of the invention. Thus in an alternative construction, either or both of the magnetic shunts may consist, as shown in Figures 4 and 5, of a plurality of substantially equal members held together and pivoted substantially about the centre of the stator or rotor respectively.

The adjustment of the members rotationally with respect to each other effects a change in the magnitude of the shunt and the whole assembly may be turned in the rotational sense with relation to either the rotor or stator in order to achieve compensation on the required axis.

The methods of attachment of the adjustable shunts are shown by way of example only; alternatively the two shunts shown may be secured to the rotor after the correct position is found by an adhesive or again adhesive may be used both for locating the multiple shunts relative to each other and for securing to the rotor. Adhesive may also be used for the stator shunts instead of the grub screws shown.

We claim:

1. An induction generator comprising a slotted stator with two windings whose axes are substantially in mutually perpendicular relationship one constituting the exciting winding and the other the output winding, a sleeve rotor, of electrically conductive material, mounted concentrically in the stator, a cylindrical core of magnetic material, for completing the magnetic circuit, positioned concentrically in the sleeve rotor but not revolving with it, and a shunt of magnetic material attached to one end of the rotor across a diameter thereof to compensate for variation in phase of the residual voltage of the generator.

2. An induction generator as claimed in claim 1 in which the shunt is constructed of a plurality of magnetic parts adjustable relative to each other, which together serve as an adjustable magnetic shunt.

3. An induction generator as claimed in claim 1 comprising an axially and radially adjustable magnetic shunt mounted on the core to reduce the residual voltage of the generator.

4. An induction generator as claimed in claim 3, in which the shunt mounted on the core comprises a plurality of members adjustable relative to each other.

References Cited in the file of this patent

UNITED STATES PATENTS

| | | |
|---|---|---|
| 1,377,229 | Tanner | May 10, 1921 |
| 2,581,093 | Gille | Jan. 1, 1952 |
| 2,671,179 | Blanchard | Mar. 2, 1954 |
| 2,671,180 | Goldberg | Mar. 2, 1954 |